Figure 1:
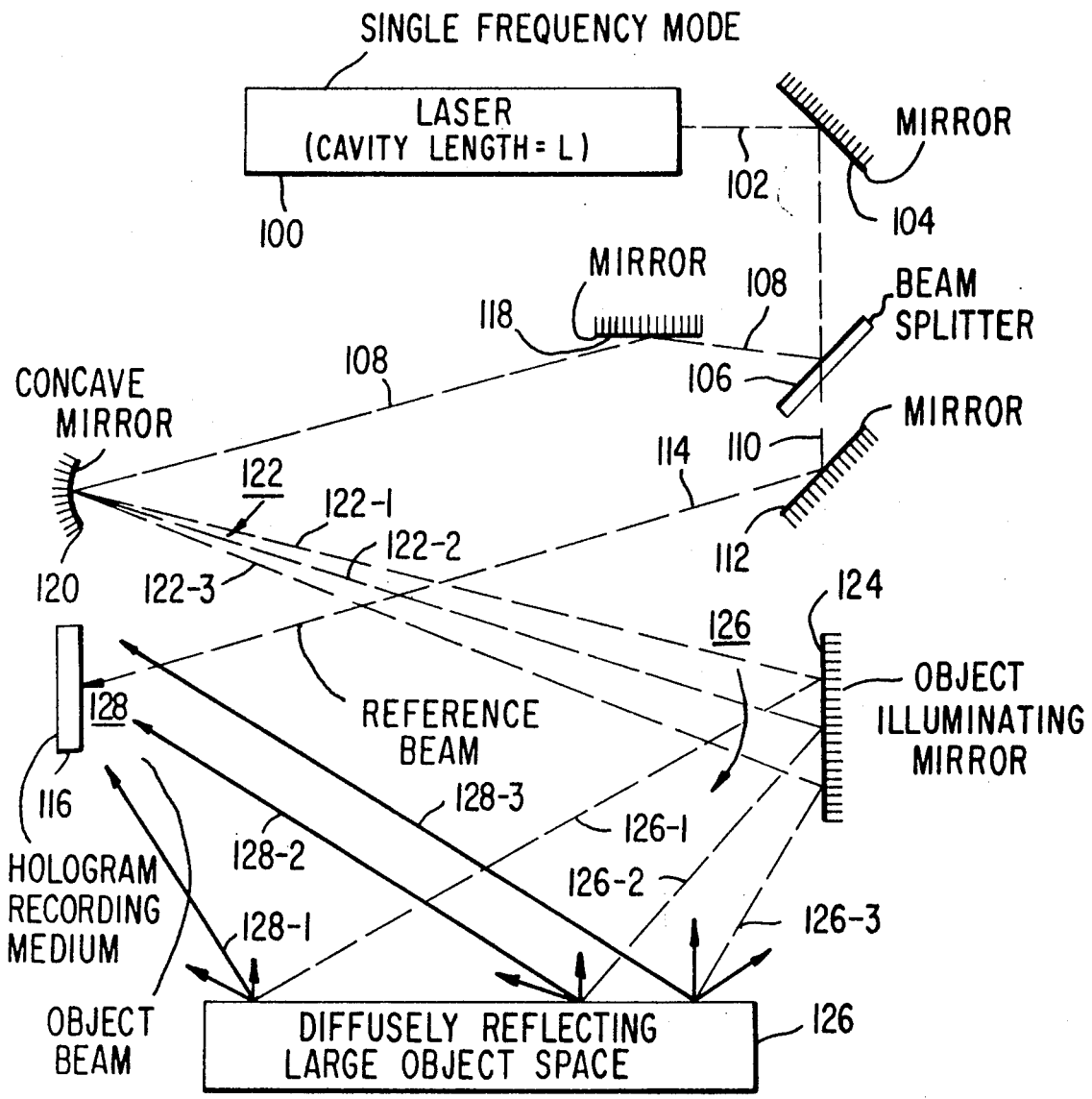

OR    3,740,111

SEARCH ROOM

Gorog et al.

[11] 3,740,111
[45] June 19, 1973

[54] HOLOGRAPHIC RECORDING SYSTEM FOR LARGE OBJECTS

[75] Inventors: Istvan Gorog, Princeton; Fred William Spong, Lawrenceville, both of N.J.

[73] Assignee: RCA Corporation, New York, N.Y.

[22] Filed: Dec. 27, 1971

[21] Appl. No.: 212,508

[52] U.S. Cl. .............................................. 350/3.5
[51] Int. Cl. ........................................... G02b 27/00
[58] Field of Search ................................. 350/3.5

[56] References Cited
UNITED STATES PATENTS
3,644,047   2/1972   Brown et al. ..................... 356/109

OTHER PUBLICATIONS

"45 Bell Laboratories Record" 238–239 (July–Aug. 1967)

Bobrinev et al., 13 "Radio Engineering and Electronic Physics" 1814, 1815 (11/1968)

*Primary Examiner*—Ronald L. Wibert
*Assistant Examiner*—Ronald J. Stern
*Attorney*—Edward J. Norton and George J. Seligsohn

[57] ABSTRACT

A holographic arrangement for recording a high quality hologram of an object having a length many times the coherence length of the coherent light waves employed in recording the hologram.

3 Claims, 2 Drawing Figures

HOLOGRAPHIC RECORDING SYSTEM FOR LARGE OBJECTS

This invention relates to a holographic recording system and, more particularly, to such a system capable of recording a hologram of an object which is large relative to the coherence length of coherent light waves employed for recording the hologram.

As is known, coherence length is defined as the velocity of light divided by the frequency bandwidth of the coherent light waves employed in recording a hologram. Therefore, unless the bandwidth is zero, the coherence length is finite. Only a single frequency laser which is stabilized against an absolute frequency standard provides a single, nearly pure time coherent sinusoidal wave having an effective bandwidth approaching zero. If a single frequency laser is not stabilized against an absolute frequency standard, then environmental changes and fluctuations will change the laser frequency over the hologram recording exposure interval.

It has been found experimentally that, during a typical hologram exposure time of ten seconds, the laser frequency of a single frequency laser, such as an argon laser utilizing an intra-cavity three-mirror interferometer, may change as much as 500 MHz. An effective light bandwidth of 500 MHz corresponds to a coherence length of 0.6 meter. This implies that if a standard holographic arrangement is used, objects larger than 0.6 meter cannot be holographed with a 500 MHz bandwidth laser.

The present invention is directed to a novel holographic arrangement which makes it possible to record a hologram of all objects situated within a given object space having a length which is many times the coherence length of the coherent light waves employed in recording the hologram.

Figure 2:
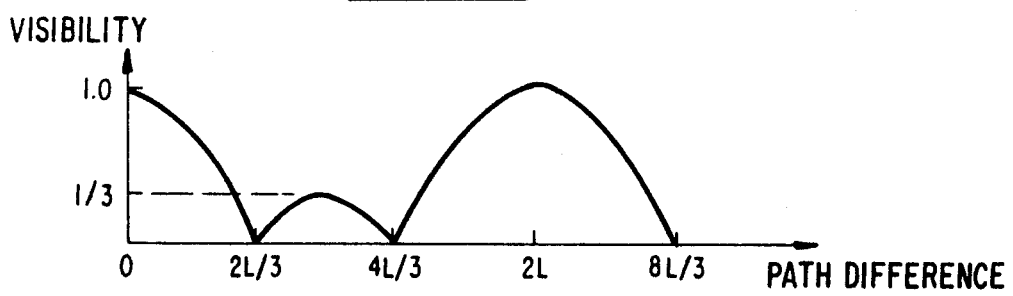

This and other features and advantages of the present invention will become more apparent from the following detailed description, taken together with the accompanying drawing, in which:

FIG. 1 is a diagram illustrating an embodiment of the holographic arrangement employed in the present invention, and FIG. 2 is a graph helpful in explaining a principle of the present invention.

Referring now to FIG. 1, there is shown laser 100, which has a cavity length of L and which operates at least approximately in a single frequency mode. The term "approximately," as just used, applies to a single frequency laser which is not stabilized against an absolute frequency standard and which may be scanned or otherwise modulated, so that the output light waves therefrom have a limited coherence length.

For the purposes of clarity in the drawing, various light beams depicted therein are represented solely by their respective center lines. In particular, output beam 102 from laser 100, after being reflected from first plane mirror 104, is incident on beam splitter 106. Beam splitter 106, which may consist of a partially reflecting mirror, divides incident output beam 102 of coherent light waves into first component 108, reflected from beam splitter 106, and second component 110, transmitted through beam splitter 106.

Second component 110, after reflection from second plane mirror 112, forms reference beam 114, which is directly incident on a given area of hologram recording medium 116.

First component beam of coherent wave energy, after reflection from third plane mirror 118, is incident on concave mirror 120. In response thereto, concave mirror 120 reflects light waves, which first converge, crossover and then diverge, to provide in the far field divergent beam 122 of the first component of the coherent light waves. Divergent beam 122 can be considered to be composed of a plurality of light rays, such as light ray 122-1, 122-2 and 122-3, which are incident on object illuminating mirror 124 at somewhat different angles of incidence with respect to each other. Each incident light ray illuminating object illuminating mirror 124 will give rise to a corresponding reflected beam 126 composed of rays, such as light rays 126-1, 126-2 and 126-3, of the first component of the coherent light waves.

As shown, the reflected light rays of beam 126, such as light rays 126-1, 126-2 and 126-3, are directed into a given large object space 126 in which may be located either a single large object or a plurality of distributed smaller objects which, in either case, diffusely reflect incident light. Therefore, each point of an object within object space 126, in response to being illuminated by a ray of reflected light beam 126 from object illuminating mirror 124, such as rays 126-1, 126-2 and 126-3, gives rise to diffusely-reflected first-component light of the coherent light waves. Some of this diffusely reflected light, such as 128-1, 128-2 and 128-3, will form an object beam 128 composed of light from the first component of the coherent wave energy which is directed towards and is incident on the same given area of hologram recording medium as the reference beam 114 composed of the second component of the coherent light waves. A hologram is formed on the given area of hologram recording medium 116 by the interference between incident object beam 128 and incident reference beam 114, which, as shown, are angularly displaced with respect to each other.

Before discussing the operation of the holographic arrangement shown in FIG. 1, certain known principles of light waves which are applicable to the present invention will be discussed. First, if two light beams that are derived from the same source interfere, and the source spectrum is periodic, then the interference-fringe visibility is a periodic function of the path length difference between the two beams. Second, the fundamental transverse mode laser has the property that, to a high degree of accuracy, the laser frequency is an integer multiple of $C/2L$, where $C$ is the speed of light and $L$ is the cavity length. Therefore, if fluctuations force the frequency of a single frequency laser to change, then it will also change in a quantized manner by multiples of approximately $C/2L$.

Merely as an illustrative example, consider the interference between two separate, equal-intensity beams derived from a single frequency laser. Assume in this example that during the exposure interval of the recording of the interference fringe pattern, the laser frequency is changed in such a manner that one-third of the exposure is obtained with each of three uniformly spaced frequency components. Then, one can show that the relative fringe visibility as a function of the path difference between the two beams is as shown in the graph of FIG. 2. As can be seen from FIG. 2, the fringe visibility is perfect as long as the path difference is an even integer multiple of the laser cavity length. Furthermore, it can be shown that this rule holds for an arbitrary number of equally spaced frequencies, although the number of lobes increase while the width of each lobe decrease.

Since holography is based on the two beam interference phenomena, the above concept shows that high quality holograms can be made with multi-frequency exposures provided that the path difference between object and reference beams is either equal to an even integral multiple of the laser cavity length or varies therefrom by an amount no greater than the coherence length of the coherent light waves emitted by the laser.

Referring again to FIG. 1, the relative locations of hologram recording medium 116, object illuminating mirror 124 and diffusely reflecting large object space 126 are selected with respect to each other so that the sum of any one of the rays of reflected beam 126, such as rays 126-1, 126-2, and 126-3, incident on a point of a diffusely reflecting object, and corresponding rays of object beam 128, such as rays 128-1, 128-2 and 128-3, differ from a given path length by no more than plus or minus the coherence length of the coherent light waves from laser 100. Further, by properly selecting the location of plane mirror 112, the path difference between the overall length of the second component of the coherent light waves forming reference beam 114 incident on hologram recording medium 116 and the overall length of the first component of coherent light waves forming object beam 128 incident on hologram recording medium 116 can be made to vary from a given even integral number of cavity lengths by no more than the coherence length of the coherent light wave emitted by laser 100. In this manner, a hologram may be recorded of all the object situated within a large object space having a length which is significantly longer than the coherence length of the coherent light waves employed in recording the hologram.

By way of example, it has been found that a high quality hologram of an object having a length of about 6 feet can be recorded with coherent light waves having a bandwidth of about 6 gigahertz. Since the coherence length of such coherent light is only about 2 inches, it can be seen that objects substantially greater than thirty times the coherence length of the coherent light waves employed can be accommodated by the holographic arrangement of the present invention.

What is claimed is:

1. A holographic recording system for recording a hologram of diffusely reflecting objects located in a given object space having a first given length employing coherent light waves having a coherence length significantly smaller than said first given length, said system comprising:
   a. means including at least an approximately single-frequency mode laser having an optical resonant cavity of a second given length for producing first and second mutually coherent components of coherent light waves each having said coherence length,
   b. a hologram recording medium having a first selected location chosen with respect to said given object space,
   c. object illuminating means comprising a single object-illuminating plane mirror and a single concave mirror having respective second and third locations chosen with respect to both said given object space and said medium so that illumination of said concave mirror with said first component of said coherent light waves reflects a single divergent beam of coherent light waves incident on said plane mirror having rays at those angles that result in the illumination of each point of said given object space with an illuminating ray of a single divergent beam of light waves reflected from said plane mirror, thereby to cause the illumination of said hologram recording medium with an object beam comprising reflected rays of said coherent light waves diffusely reflected from each illuminated point of any object within said given object space, said first and third selected locations being such that the sum of the lengths of any pair of illuminating and reflected rays of any one illuminated point of an object differs from a predetermined length by no more than said coherence length, and
   d. means for illuminating said concave mirror with said incident beam of first component of said coherent light waves to derive the light which illuminates said hologram recording medium as said object beam and simultaneously directly illuminating said hologram recording medium with a reference beam of said second component of said coherent light waves which is angularly displaced from said object beam, the difference in the overall length of the path of light derived from said first-component of said coherent light waves which illuminates said hologram recording medium as said object beam and the overall length of the path of light which illuminates said hologram recording medium directly as said reference beam being substantially equal to an even integral multiple of said second given length.

2. The system defined in claim 1, wherein said first given length is at least thirty times said coherence length.

3. A system for recording on a hologram medium an object having a first given length and located in a given object space employing coherent light waves having a coherence length significantly smaller than said first given length, said hologram medium having a first selected location chosen with respect to said given object space, said system comprising:
   a. means for producing from an approximately single-frequency mode laser having an optical resonant cavity of a second given length first and second mutually coherent components of coherent light waves each having said coherence length,
   b. object illuminating means comprising a single object-illuminating plane mirror and a single concave mirror having respective second and third locations chosen with respect to both said given object space and said medium so that illumination of said concave mirror with said first component of said coherent light waves reflects a single divergent beam of coherent light waves incident on said plane mirror having rays at those angles that result in the illumination of each point of said given object space with an illuminating ray of a single divergent beam of light waves reflected from said plane mirror, thereby to cause the illumination of said medium with an object beam comprising reflected rays of said coherent light waves diffusely reflected from each illuminated point of any object within said given object space, said first and third selected locations being such that the sum of the lengths of any pair of illuminating and reflected rays of any one illuminated point of an object differs from a predetermined length by no more than said coherence length, and c. means for illuminating said concave mirror with said incident beam of said first component of said coherent light waves to derive the light which illuminates said medium as said object beam and simultaneously directly illuminating said medium with a reference beam of said second component of said coherent light waves which is angularly displaced from said object beam, the difference in the overall length of the path of light derived from said first-component of said coherent light waves which illuminates said hologram recording medium as said object beam and the overall length of the path of light which illuminates said hologram recording medium directly as said reference beam being substantially equal to an even integral multiple of said second given length.

* * * * *